(12) United States Patent
Barfield, Jr. et al.

(10) Patent No.: US 9,392,431 B2
(45) Date of Patent: Jul. 12, 2016

(54) AUTOMATIC VEHICLE CRASH DETECTION USING ONBOARD DEVICES

(71) Applicant: Verizon Patent and Licensing Inc., Arlington, VA (US)

(72) Inventors: James Ronald Barfield, Jr., Atlanta, GA (US); Stephen Christopher Welch, Atlanta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/502,423

(22) Filed: Sep. 30, 2014

(65) Prior Publication Data

US 2016/0094964 A1    Mar. 31, 2016

(51) Int. Cl.
| | |
|---|---|
| *B60R 21/00* | (2006.01) |
| *H04W 4/22* | (2009.01) |
| *H04W 4/04* | (2009.01) |
| *H04W 4/00* | (2009.01) |
| *H04Q 9/00* | (2006.01) |
| *B60R 21/0132* | (2006.01) |
| *B60R 21/013* | (2006.01) |

(52) U.S. Cl.
CPC .............. *H04W 4/22* (2013.01); *B60R 21/013* (2013.01); *B60R 21/0132* (2013.01); *H04Q 9/00* (2013.01); *H04W 4/005* (2013.01); *H04W 4/046* (2013.01); *B60R 2021/01325* (2013.01)

(58) Field of Classification Search
CPC ... H04W 4/22; B60R 21/0132; B60R 21/013; B60R 2021/01315; B60R 2021/01325; B60R 2021/0011; B60R 2021/0027; B60R 21/01558; B60R 19/483; B60R 2021/0006
See application file for complete search history.

(56) References Cited

U.S. PATENT DOCUMENTS

| | | | | |
|---|---|---|---|---|
| 2011/0193695 | A1* | 8/2011 | Koie | G08G 1/205 340/438 |
| 2012/0310473 | A1* | 12/2012 | Yoshii | G01P 21/00 701/33.1 |
| 2013/0006469 | A1* | 1/2013 | Green | G07C 5/008 701/36 |
| 2013/0332026 | A1* | 12/2013 | McKown | H04W 4/22 701/33.7 |

* cited by examiner

*Primary Examiner* — Olumide T Ajibade Akonai

(57) ABSTRACT

Vehicle collisions may be automatically detected and reported based to a call center. The collisions may be automatically detected based on a collision detection model that receives sensor data, or other data, as input, and outputs an indication of whether there is a collision. The collision detection model may be trained on historical sensor data associated with potential vehicle collisions, where the historical sensor data is labeled to indicate whether the data corresponds to an actual collision.

20 Claims, 11 Drawing Sheets

AUTOMATIC VEHICLE CRASH DETECTION USING ONBOARD DEVICES

BACKGROUND

"Vehicle telematics" may broadly refer to monitoring of the location, movement, status, diagnostic information, and/or behavior of a vehicle. A telematics device may include sensors (e.g., a GPS sensor, accelerometer, microphone, or other sensors) to obtain data relating to the operation of the vehicle. The telematics device may additionally include communication circuitry, such as a radio, to allow communications with remote analytics servers, and/or to place voice calls, such as with other call centers or emergency response centers.

Some vehicle telematics devices function to automatically detect the occurrence of vehicle collisions. The detection of the vehicle collision may be based on the monitoring of acceleration data to determine when a collision is likely to have occurred. The collision may be automatically reported to a call center or emergency response center, where an operator may further evaluate the situation and determine whether emergency response personnel should be dispatched.

When detecting collisions, it can be important to be able to accurately detect all collisions, or to accurately detect all collisions that correspond to at least a threshold of seriousness. At the same time, however, it is desirable to minimize false positives (i.e., events that are detected as a collision but which are actually not collisions). False positive collision events can annoy the driver (e.g., due to a call center operator asking whether assistance is needed) and can cause additional expense and strain on the system.

DETAILED DESCRIPTION OF PREFERRED EMBODIMENTS

The following detailed description refers to the accompanying drawings. The same reference numbers in different drawings may identify the same or similar elements.

Techniques described herein may provide for the automatic detection and reporting of vehicle collisions. The collisions may be automatically detected based on a collision detection model that receives sensor data, or other data, as input, and outputs an indication of whether there is a collision. The collision detection model may be trained based on labeled training data for which call center logs, police reports, or other outside information is used to definitively label the data as corresponding to a real-world vehicle collision.

Figure 1:
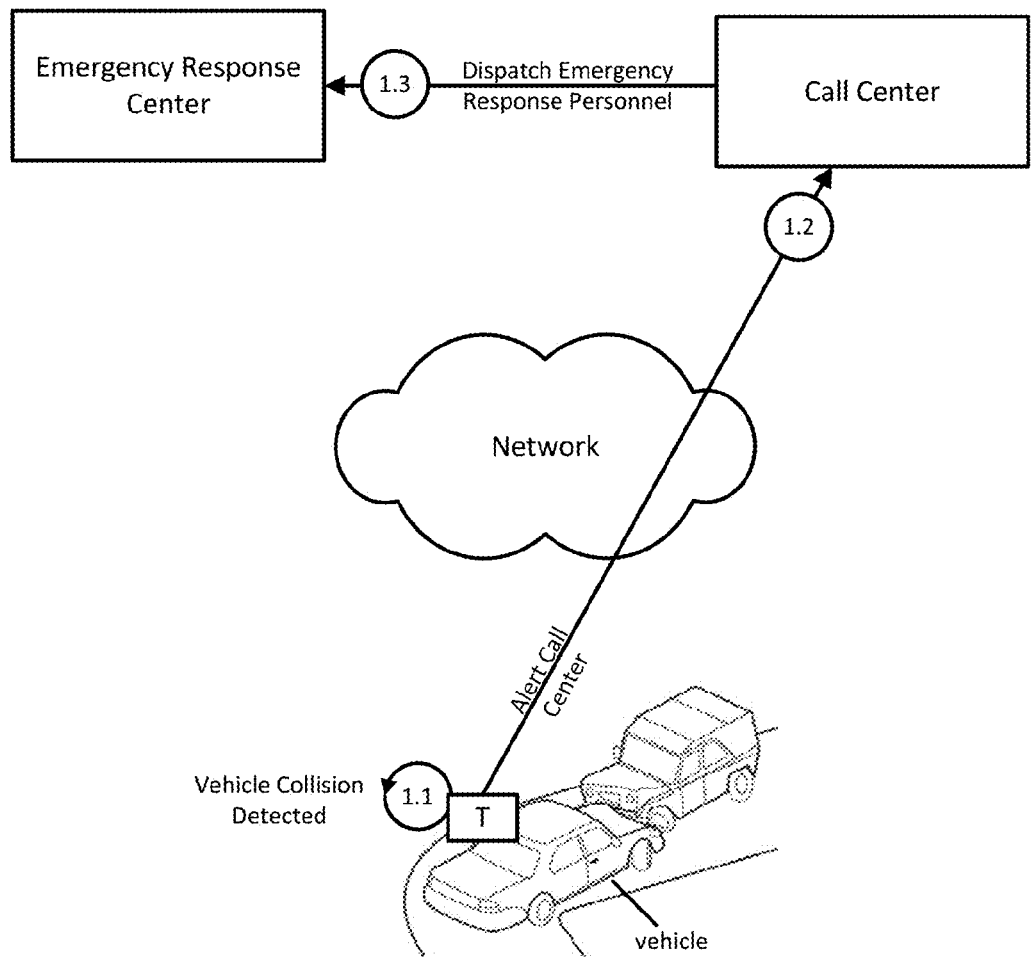
FIG. 1 is a diagram illustrating an overview of an example of concepts described herein.

FIG. 1 is a diagram illustrating an overview of an example of concepts described herein. As illustrated in FIG. 1, a vehicle may include a telematics device (T). The telematics device may include sensors, such as an accelerometer and/or other sensors. The telematics device may, based on data received from the sensors and/or based on other data, such as data received from an On-Board Diagnostics port of the vehicle, determine that a vehicle collision is likely to have occurred (at 1.1, "Vehicle Collision Detected").

Determination of the vehicle collision may be based on the evaluation of one or more classification models, called "collision detection models" herein, that have been trained based on training data. The training data may include data relating to previous indications, by the models, of vehicle collisions associated with a number of other vehicles. The previous vehicle collision indications may have been manually classified as collision or non-collision events. For example, previous vehicle collision events may be classified as a collision event when a call center agent is explicitly told that a collision occurred and/or when emergency response personnel are dispatched. The models may be downloaded or otherwise installed in the vehicle. In one implementation, the models may be occasionally trained and updated at the vehicles to potentially gain the advantage of the increasing size of the training data over time.

In response to the detection of a potential vehicle collision, the telematics device may alert a call center, such as by signaling the call center via a wireless network, such as a cellular wireless network (at 1.2, "Alert Call Center"). An operator, at the call center, may determine how to best handle the alert. For example, the operator may speak to a driver of the vehicle ask the driver whether the driver needs assistance. In this example, assume that the call center operator determines that emergency response personnel are needed (e.g., the driver may confirm that there has been a non-trivial vehicle collision and/or the driver may fail to respond to voice prompts from the call center operator). In this case, the call center operator may communicate with an emergency response center (e.g., a 911 response center, a police, fire, or ambulance team local to the vehicle collision, etc.) to provide information relevant to the emergency response personnel (e.g., the location of the vehicle collision, the potential severity of the vehicle collision, etc.) (at 1.3, "Dispatch Emergency Response Personnel").

Figure 2:
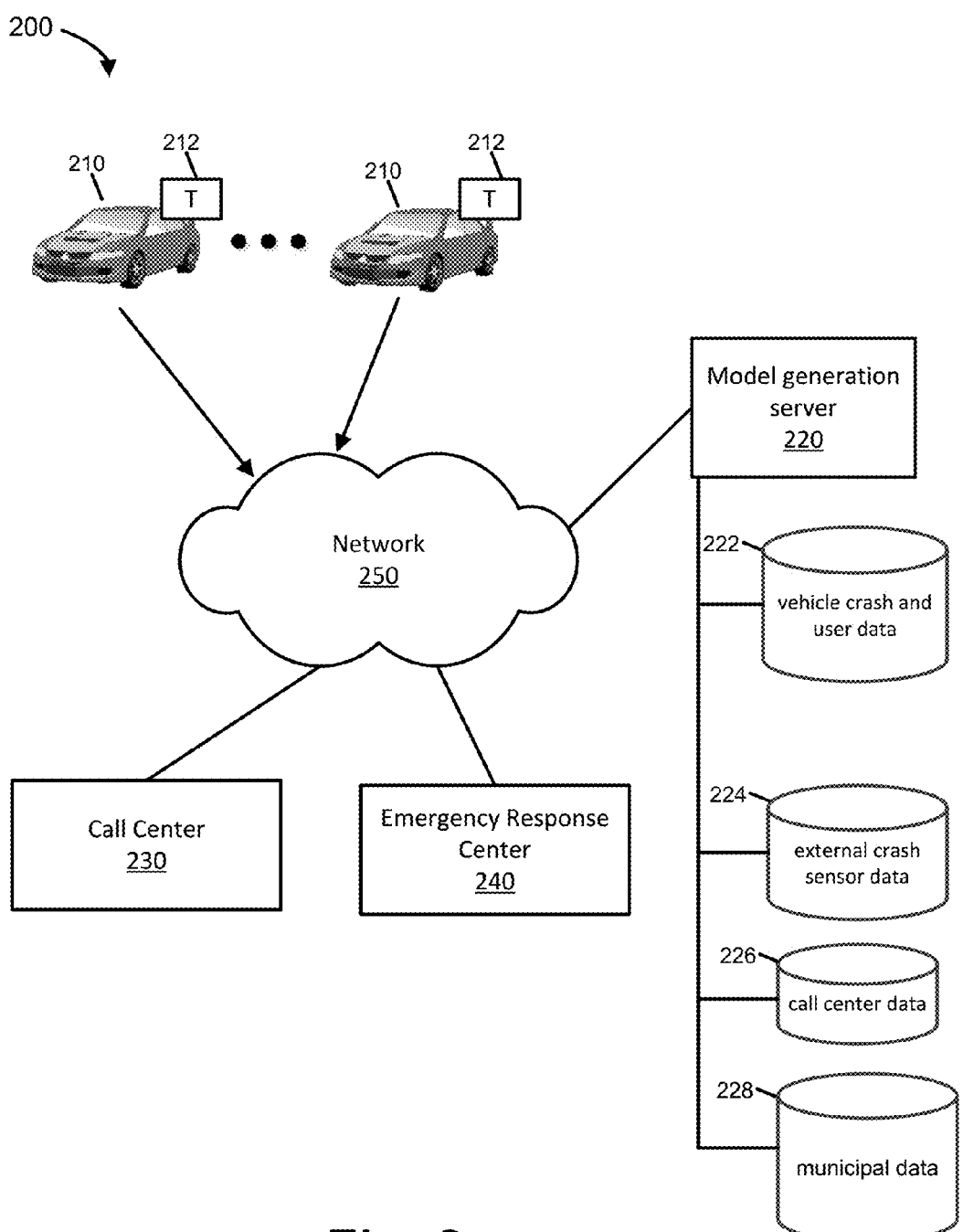
FIG. 2 is a diagram illustrating an example environment in which systems and/or methods described herein may be implemented.

FIG. 2 is a diagram illustrating an example environment 200, in which systems and/or methods described herein may be implemented. As shown in FIG. 2, environment 200 may include one or more vehicles 210, model generation server 220, call center 230, emergency response center 240, and network 250.

Each of vehicles 210 may generally represent any vehicle, such as an automobile, truck, motorcycle, boat (or other water craft), etc. Vehicle 210 may include telematics device 212, such as an aftermarket telematics device installed via an On-Board Diagnostics (OBD) port or a telematics device that is installed during manufacture of vehicle 210. In some implementations, telematics device 212 may include a smart phone, wearable device, or other device that is portable and that may not necessarily be a dedicated telematics device. Telematics device 212 may generally operate to sense environmental data (e.g., via accelerometers or other sensors) and/or receive data from the OBD system of vehicle 210, and use the sensed/received data to evaluate a model that is trained to output indications of vehicle collisions. An example implementation of telematics device 212 is described in more detail below with reference to FIG. 3.

Model generation server 220 may include one or more computing devices, potentially geographically distributed, that receive vehicle data, such as from telematics devices 212 and/or from other sources, and generate the models that can be installed at telematics devices 212. Model generation server 220 may generate the models based on data that may be conceptualized as four types of vehicle data: vehicle crash and user data 222, external crash sensor data 224, call center data 226, and municipal data 228.

Vehicle crash and user data 222 may include data relating to historical vehicle collisions, such as when particular vehicles were involved in vehicle collisions (crashes) and when telematics devices 212, of particular vehicles, indicated potential vehicle collisions that were determined to not actually be collisions (non-crashes). Vehicle crash and user data 222 may also include user demographic data, such as, for example, driver age, driver gender, driver home location, etc. Vehicle crash and user data 222 may further include information relating to online activity of the driver, such as web browsing history or social network activity. The information relating to online activity may be gathered with permission of the driver. Vehicle crash and user data 222 may also include information relating to the particular vehicle of the driver, such as vehicle make, model, and/or year of the vehicle.

External crash sensor data 224 may include sensor data or other data that is related to vehicle collisions or potential vehicle collisions. For example, when a collision is detected by telematics device 212, data relating to the circumstances of the collision may be recorded and provided, by telematics device 212, to model generation server 220. The data may include sensor data (acceleration data, audio data, etc.) and/or data received from the OBD system of vehicle 210.

Call center data 226 may include audio recordings of conversations with operators at call center 230 that were initiated in response to automatic detection of vehicle collisions. Call center data 226 may additionally include other information relating to the call center conversations, such as whether emergency personnel were dispatched to the scene of the vehicle collision and/or notes taken by the call center operator. Municipal data 228 may include police reports, images from traffic cameras, or other external data that may be obtained from municipalities or other entities.

Call center 230 may include one or more devices or systems (e.g., telephones, computers, displays, etc.) designed to provide emergency services, concierge services, or other services that are provided in conjunction with an operator. For example, call center 230 may be associated with operators trained to handle telephone calls from users that may require assistance. The telephone calls may be manually placed by the users or automatically placed, by telematics devices 212, in response to detection of a potential vehicle collision. The operators may speak to the user that potentially requires assistance and/or may view device-specific data, user-specific data, or situation specific data (e.g., data generated or sensed by telematics devices 212). Depending on the situation, the operator may take actions to assist the user, such as by contacting emergency response center 240.

Emergency response center 240 may include one or more devices or systems (e.g., telephones, computers, displays, etc.) designed to provide emergency services, concierge services, or other services that are provided in conjunction with an operator. For example, emergency response center 240 may represent a Public Safety Answering Point (PSAP) (e.g. a 9-1-1 response center), a law enforcement office, a firehouse, an urgent care facility or some other type of medical facility, or some other location that provides emergency response services.

Network 250 may represent a wireless network (e.g., a wireless cellular network), and/or a wired network, through which vehicles 210, telematics devices 212, model generation server 220, call center 230, and/or emergency response center 240 may communicate. Network 250 may include a wide area network ("WAN"), a metropolitan area network ("MAN"), the Internet, a fiber optic-based network, and/or a combination of these or other types of networks. In one implementation, network 250 may include a wireless network that is implemented based on the Long Term Evolution ("LTE") standard. In other implementations, network 250 may include a wireless network implemented based on other standards, such as a Code Division Multiple Access ("CDMA") 2000 1× network, a second generation ("2G") wireless network, a third generation ("3G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 250 may be communicatively coupled to one or more other networks.

Although FIG. 2 illustrates example components that may be included as part of system 200, in other implementations, the components illustrated in FIG. 2 may contain fewer components, different components, differently arranged components, or additional components than those depicted. Alternatively, or additionally, one or more of the components illustrated in FIG. 2 may perform one or more other tasks described as being performed by one or more other components of FIG. 2.

Figure 3:
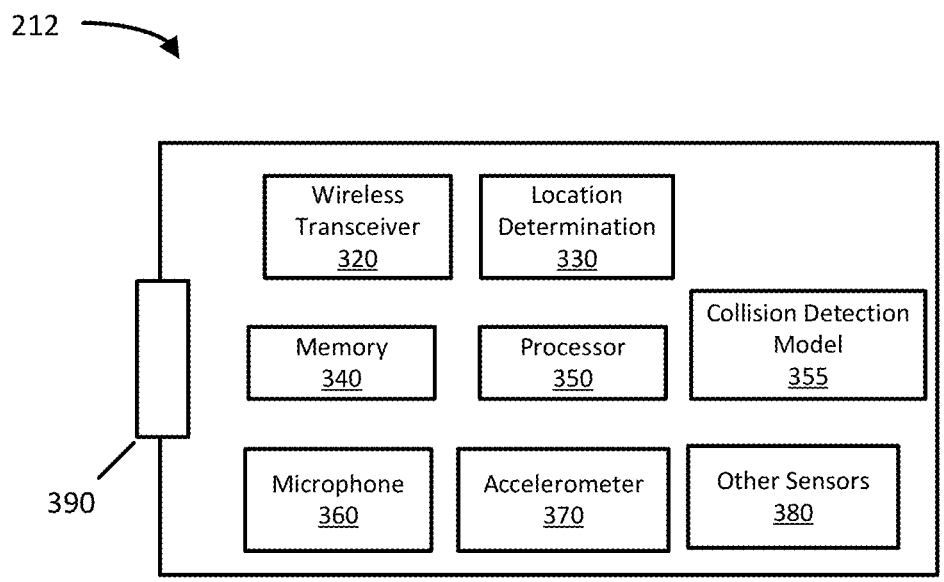
FIG. 3 is a block diagram conceptually illustrating an example of components that may be included within a telematics device.

FIG. 3 is a block diagram conceptually illustrating an example of components that may be included within telematics device 212. In some implementations, telematics device 212 may be configured to couple to an OBD-II port of a vehicle and may obtain electrical power from the port. In this situation, in addition to obtaining data from sensors implemented within telematics device 212, telematics device 212 may obtain information from the OBD system of the vehicle. In other implementations, telematics device 212 may be implemented independently of the OBD system of the vehicle (e.g., as part of a smart phone or other device).

As illustrated, telematics device 212 may include wireless transceiver 320, location determination component 330 (e.g., a Global Positioning System (GPS) component), memory 340, processor 350, collision detection model 355, microphone 360, accelerometer 370, other sensors 380, and connector 390 (e.g., an OBD-II diagnostics connector).

Wireless transceiver 320 may include an antenna, radio transceiver circuitry, and/or other circuitry to implement a radio interface. The radio interface may be, for example, a wireless cellular interface. A wireless cellular connection may include a wireless connection formed over a licensed frequency band (i.e., a frequency band that may be licensed by a telecommunications provider to provide cellular wireless service to customers). Alternatively or additionally, wireless transceiver 320 may implement a radio interface for short range wireless connections. A short range wireless connection may include a wireless connection formed over an unlicensed frequency band (i.e., a frequency band that may be legally used without requiring a license from an applicable government entity). Examples of possible short range wireless networking technologies, which may be implemented by short range wireless component 310, include Wi-Fi (i.e., IEEE 802.11 based technologies), Bluetooth®, or other wireless technologies. Cellular wireless connections may generally include longer connection ranges and wider connection areas than short range wireless connections.

GPS component 330 may include circuitry or other logic to receive and process GPS signals. GPS component 330 may obtain, or assist in obtaining, a geographic location of telematics device 212. In other implementations, other satellite positioning systems may alternatively or additionally be used. Other location determination techniques, such as those based on determining the location of nearby cellular base stations, may alternatively or additionally be used.

Memory 340 may include any type of dynamic storage device that may store information and instructions for execution by processor 350, and/or any type of non-volatile storage device that may store information for use by processor 350. Processor 350 may include a processor, microprocessor, or processing logic that may interpret and execute instructions, such as instructions stored in memory 340. Telematics device 212 may perform certain operations that implement processes relating to obtaining and transmitting data (such as location data determined by GPS component 330, audio data sensed by microphone 360, acceleration data sensed by accelerometer 370, and/or data sensed by other sensors 380) to an external device, such model generation server 220. Telematics device 212 may perform these operations in response to processor 350 executing software instructions stored in a computer-readable medium, such as memory 340. A computer-readable medium may be defined as a non-transitory memory device.

Collision detection model 355 may implement a classification model (or other algorithm) that is used to determine when vehicle 210 is involved in a collision. The model may be dynamically downloaded or updated, from model generation server 220, at various times, such as when an updated model is available at model generation server 220. The model may include, for example, a model based on binary decision trees (BCTs), pattern matching techniques, random forests, support vector machines, artificial neural networks, logistic regression, naïve Bayes, Gaussian processes, or other techniques. In some implementations, collision detection model 355 may be implemented using dedicated hardware. In other implementations, collision detection model 355 may be implemented as software executed by telematics device 212. In this implementation, collision detection module 355 may be, for example, be implemented as one or more instructions or data within memory 340. The operation and training of collision detection model 355 is described in more detail herein.

Microphone 360 may include an electroacoustic transducer to sense sound. Accelerometer 370 may include a device to measure acceleration. Accelerometer 370 may measure proper acceleration and may output the measured acceleration as three values, corresponding to the measured acceleration values along orthogonal axes of the accelerometer. In various implementations, telematics device 212 may include other sensors 380, such as a gyroscope, a barometer (for detecting elevation), a magnetometer, a compass, and/or other sensors.

Connector 390 may be a physical connector designed to be plugged into an OBD port (using an OBD-II standardized interface) of a vehicle. In other implementations, in which telematics device 212 is not an OBD device, connector 390 may include a physical clip or other device designed to physically secure telematics device 212 to vehicle 210.

Although not explicitly shown in FIG. 3, wireless transceiver 320, GPS component 330, memory 340, processor 350, collision detection model 355, microphone 360, accelerometer 370, and/or other sensors 380 may be connected to one another through one or more buses. Further, telematics device 212 may contain fewer components, different components, differently arranged components, or additional components than those depicted. Alternatively, or additionally, one or more components of telematics device 212 may perform one or more other tasks described as being performed by one or more other components.

Figure 4:
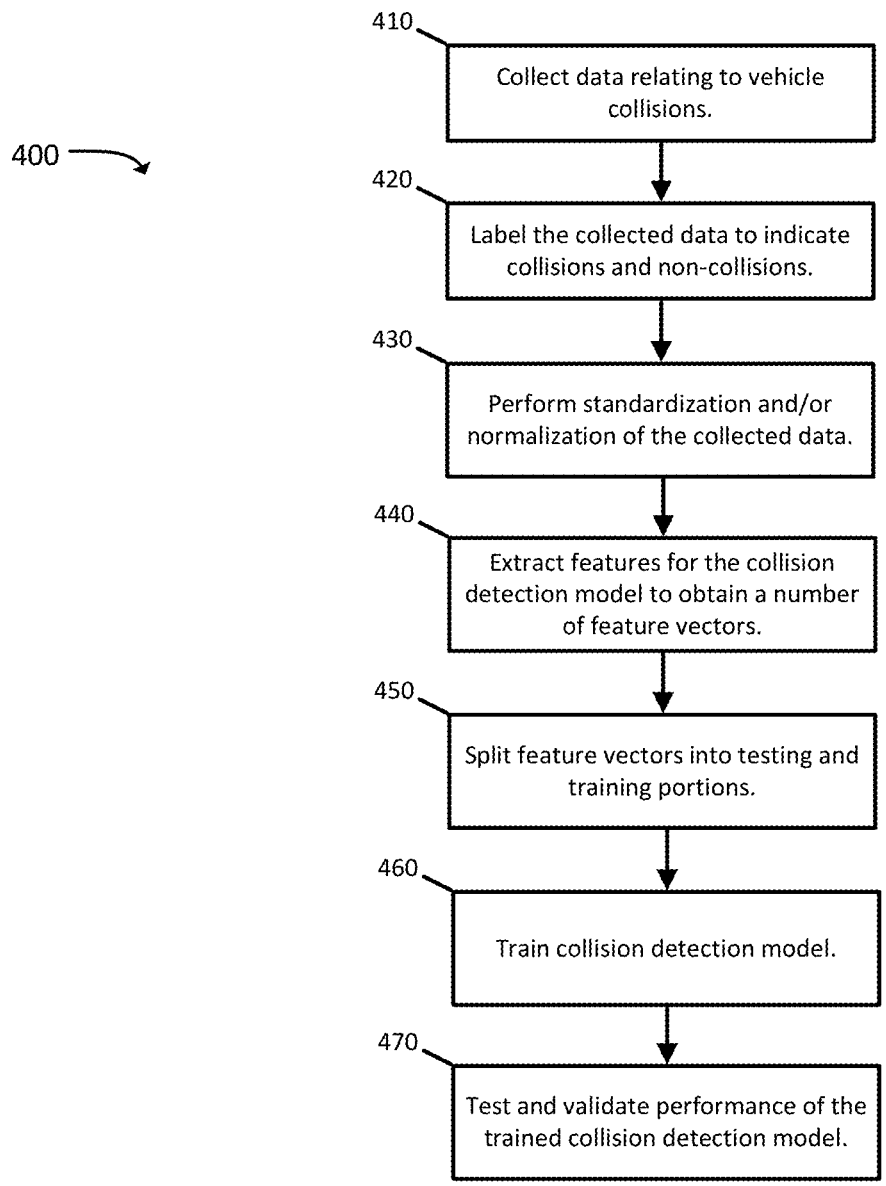
FIG. 4 is a flowchart illustrating an example process relating to the generation of collision detection models.

FIG. 4 is a flowchart illustrating an example process 400 relating to the generation of collision detection models.

Process 400 may include collecting data relating to vehicle collisions (block 410). The type of collected data may be similar to that illustrated in FIG. 2 as vehicle crash and user data 222, external crash sensor data 224, call center data 226, and municipal data 228. As mentioned, the data may include sensor data, such as sampled time-series data relating to the real-world acceleration of vehicles in a collision, as well as other data, such as a call center data 226 or municipal data 228 that may be used to definitively indicate whether a crash occurred and potentially indicate the severity of the crash. In one implementation, whenever a telematics device 212 signals the occurrence of a collision, the indication of the collision, as well as sensor data and other data corresponding to the time of the collision, may be transmitted to and stored by model generation server 220.

In some situations, it may be important to distinguish the source of the collected data. For example, some of the historical crash data may correspond to data collected using an older version of collision detection model 355. Different versions of collision detection model 355 may create biases in the data. For example, older version of collision detection model 355 may use an acceleration threshold of 3.0 g (g-force) before applying the model while a newer version of collision detection model 355 may use an acceleration threshold of 3.2 g. The differences in the acceleration thresholds may create biases due to missing data that was never recorded in one version of collision detection model 355 but would have been recorded in another version of collision detection model 355. It may thus be desirable to distinguish between the sources of the collected collision data and to potentially use the indications of the different sources during training.

Figure 5:
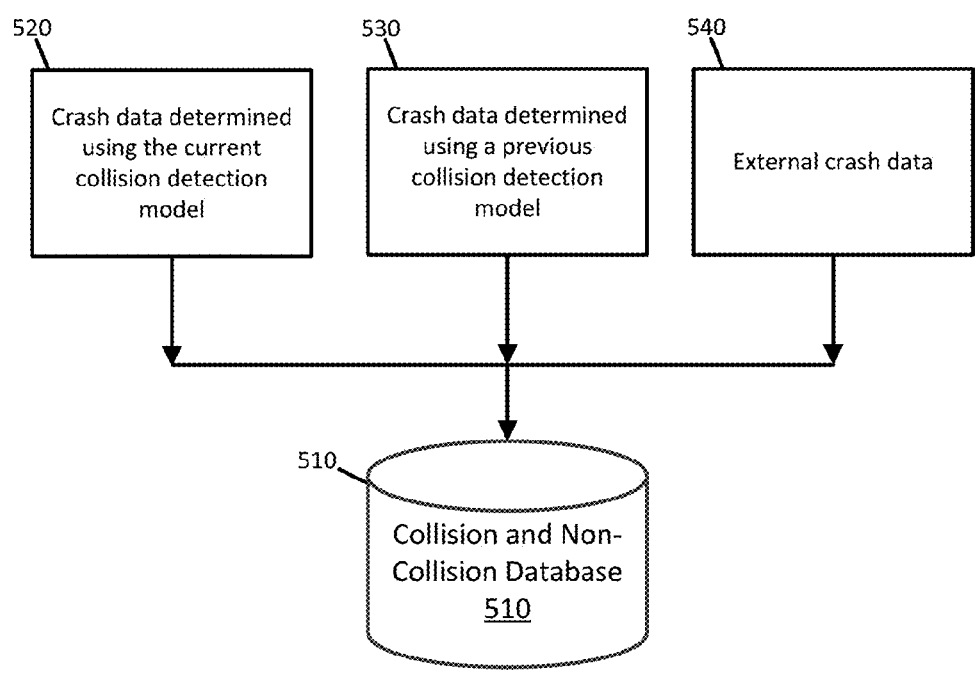
FIG. 5 is a diagram illustrating different sources of vehicle collision data.

FIG. 5 is a diagram illustrating different sources of vehicle collision data. As illustrated, collision and non-collision database 510 may represent a database that includes data drawn from the types of data illustrated in FIG. 2 (i.e., vehicle crash and user data 222, external crash sensor data 224, call center data 226, and municipal data 228). In the example of FIG. 5, three types of crash data are illustrated as being inputs to collision and non-collision database 510: crash data 520, determined using the current collision detection model; crash data, 530, determined using the previous collision detection model; and external crash data 540. Crash data 520 may represent data relating to vehicle collisions that were determined using automatic collision notifications triggered by the current version of collision detection model 355. Crash data 530 may represent data relating to vehicle collisions that were determined using automatic collision notifications triggered by a previous version of collision detection model 355. External crash data 540 may represent data relating to vehicle collisions that were determined in another manner, such as by simulated vehicle collisions (e.g., in a laboratory using crash dummies).

Referring back to FIG. 4, process 400 may further include labeling the collected data to indicate collisions and non-collisions (block 420). As previously mentioned, the collected data may relate to vehicle collisions that were detected by collision detection model 355 on real-world (i.e., live driving situations) data. Some of the indications of a collision, however, may be false positives. Call center data 226 and municipal data 228 may be used to correctly label data for particular collisions as either "collision data" (i.e., confirmed vehicle collisions) or "non-collision data" (i.e., confirmed non-collisions). For example, a technician may listen to recorded call center conversations, view notes taken by the call center operator, and/or view police reports or other reports, to manually determine whether data corresponding to an indicated collision represents an actual vehicle collision or a false positive. In some implementations, the call center operator, may indicate, when handling a call relating to a potential collision, a severity of a collision. In this case, the information entered by the call center operator may be directly used to generate the labels. The labels relating to whether a particular collision corresponds to collision data or non-collision data may be stored, such as in collision and non-collision database 510.

In some implementations, instead of or in addition to labeling vehicle collisions as simply crash or non-crash incidents, the vehicle collisions may be labeled using a severity scale (e.g., a scale of one through four, with a rating of one indicating no crash or very minor crash and four indicating severe crash). Severity may be determined by automated processes, such as by measuring the maximum or average magnitude of the acceleration during the vehicle collision, using sentiment analysis on call center logs or searching for keywords in call center logs that indicate severe collisions (such as injuries), or by manually listening to call center recordings and assigning a severity score based on the conversation between the call center operator and the driver. Combinations of these techniques may be used to assign crash severity ratings.

The collected data may be cleaned or otherwise processed to remove erroneous values or duplicates. For example, sensors may malfunction, resulting in data that does not correspond to real-world measurements. Erroneous data may be identified by visual inspection, heuristics-based checks on sensor data, or more sophisticated approaches such as k-means clustering on raw sensor data. Clustering may result in several "main" clusters that correspond to typical sensor observations, while other clusters (often separated by more distance in Euclidean space than the distance between typical acceleration measurements) may correspond to erroneous data.

Process 400 may include performing standardization and/or normalization of the collected data (block 430). Standardization/normalization of the collected data may be performed due to the fact that the collected data is received from a number of different sources, such as different types of sensors or different makes of sensors.

Figure 6:
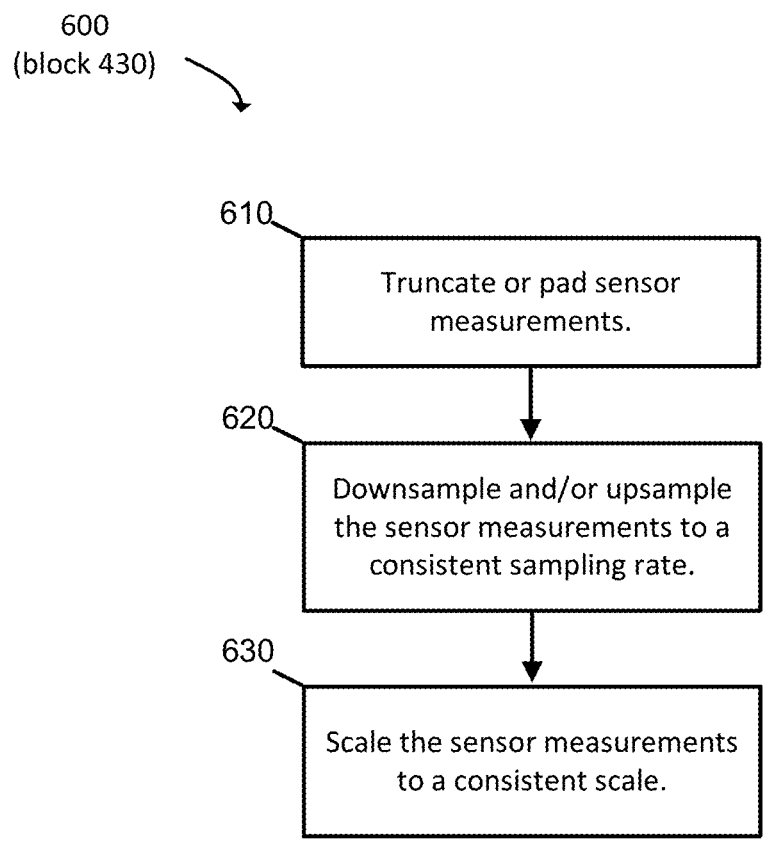
FIG. 6 is a flowchart illustrating an example of a process corresponding to the standardization or normalization of data.

FIG. 6 is a flowchart illustrating an example of a process 600 corresponding to the standardization and/or normalization, as performed in block 430, in additional detail. Process 600 may include truncating or padding sensor measurements (or other measurements) to a consistent length (block 610). For example, if a subset of the acceleration magnitude data is of length 500 samples, and another subset of the acceleration magnitude data is of length 800 samples, the subset of length 500 samples may be padded to create an overall length of 800 samples. Process 600 may further include downsampling or upsampling the sensor data to ensure a consistent sampling rate between various collected samples (block 620). For example, it may be desirable to ensure that all acceleration data is sampled at the same sampling rate (e.g., 50 Hz). Acceleration data corresponding to accelerometers that sampled the acceleration measurements at a higher frequency may be downsampled to 50 Hz. Similarly, acceleration data corresponding to accelerometers that sampled the acceleration measurements at a lower frequency may be upsampled to 50 Hz.

Process 600 may further include scaling sensor measurements to a consistent scale (block 630). Different sensor measurements, by different models of sensors (such as different models of accelerometers), may be recorded at different scales. For example, a first set of accelerometer measurements (e.g., from a first type of accelerometer) may be initially recorded such that the integer value 10,000 represents 1 g of acceleration, while a second set of accelerometer measurements (e.g., from a second type of accelerometer) may be initially recorded such that the integer value 100,000 represents 1 g of acceleration. In this situation, the different acceleration measurements may be scaled to be uniform, such as by multiplying the values associated with the first set of accelerometer measurements by a factor of 10.

Referring back to FIG. 4, process 400 may additionally include extracting features, from the data, to use for the collision detection model, to obtain a number of feature vectors (block 440). A "feature" as used herein, may refer to an input to the collision detection model. A particular collision detection model may receive a number of features as inputs and, based on the input features, output an indication of whether a collision was detected. A "feature vector," as used herein, may refer to the complete set of features that are input to a particular model. The features may correspond to "raw" values, such as raw sensor measurements, or computed values. Examples of computed values include: an average of a number of measured sensor values (e.g., the average of the last 50 acceleration magnitude measurements), a sum of a number of measured values, the slope of a time-series curve defined by a number of measured values, a Boolean indication of an event or state (e.g., whether the driver tends to break hard), or other processed values. Using features based on computed values may provide for a compressed representation of the sensor measurements.

The features to extract may be determined in a number of ways, such as in an ad hoc fashion by a technician, or determined by an unsupervised learning algorithm such as a sparse autoencoder or k-means clustering. Alternatively or additionally, the features to extract may be determined by a supervised algorithm such as artificial neural networks, support vector machines, Gaussian process models, or decision trees. Ad hoc features may be chosen by specific techniques, such as sequentially determining critical points around a maximum.

Figure 7:
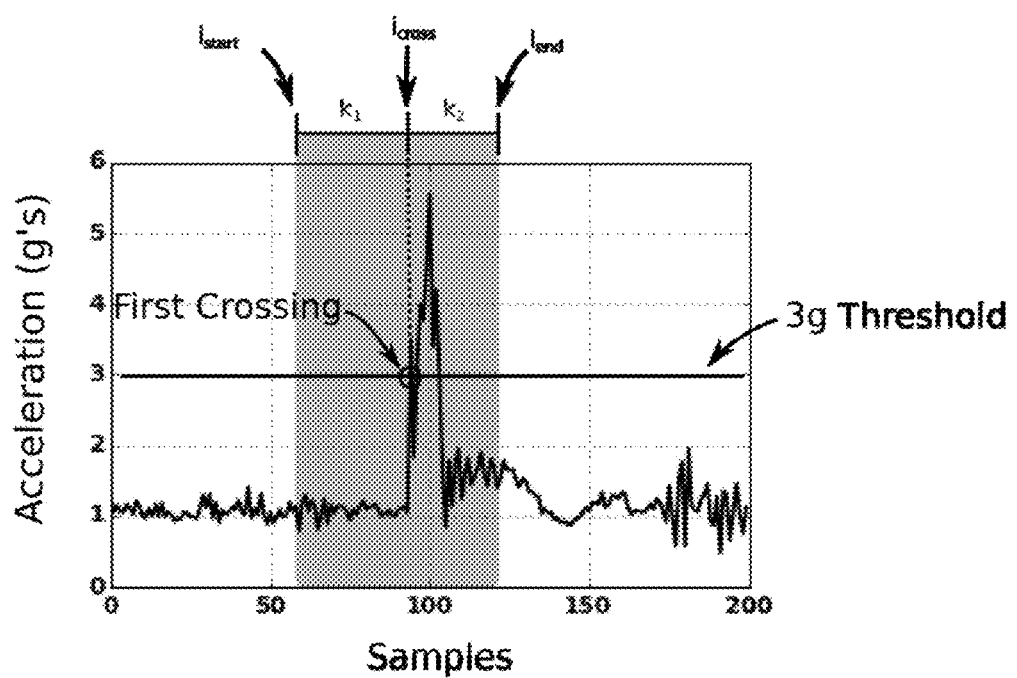
FIGS. 7 and 8 are diagrams illustrating the extraction of features from a time-series of acceleration magnitude values.
Figure 8:
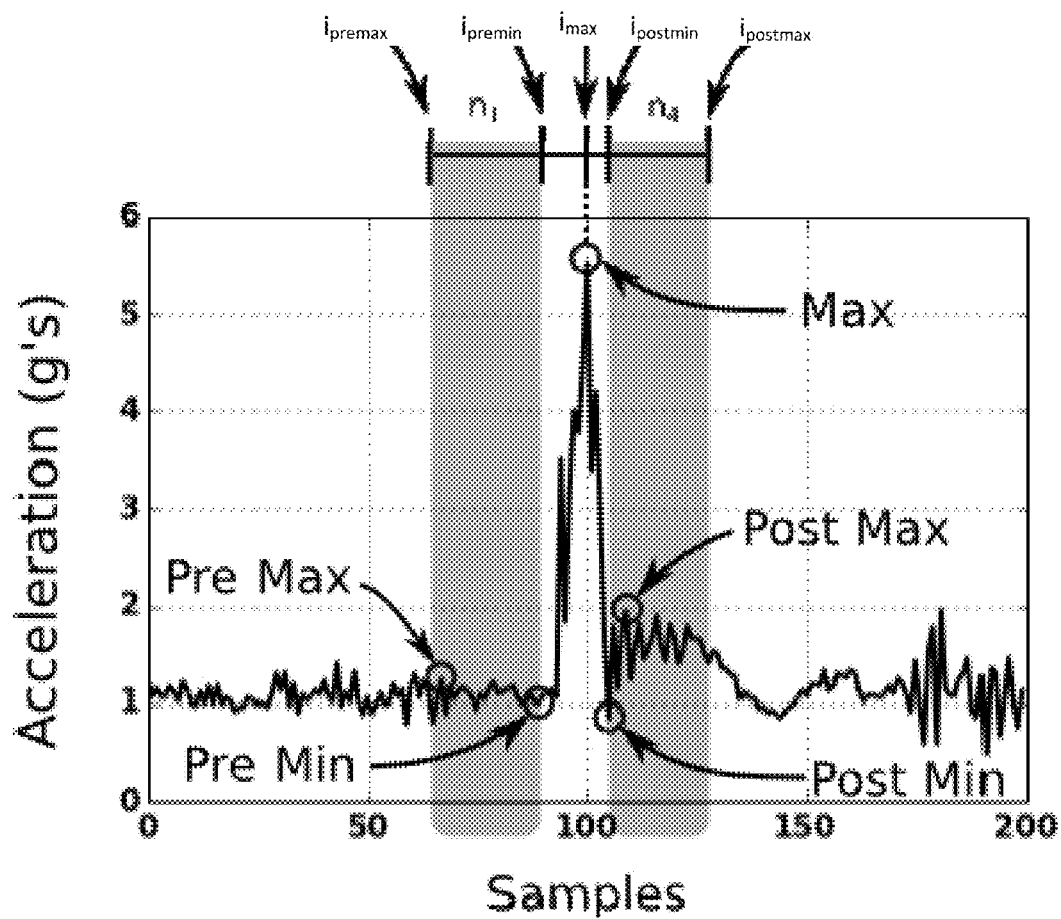

In some implementations, features may be extracted around threshold crossing points. FIGS. 7 and 8 are diagrams illustrating the extraction of features, from a time-series of acceleration magnitude values, based on extracting the features around a threshold crossing point. For a three axes accelerometer, acceleration may be measured and output as three values, corresponding to three orthogonal axes (e.g., the X, Y, and Z axis). Acceleration magnitude, M, may be computed as:

$$M=\sqrt{a_x^2+a_y^2+a_z^2} \qquad (1)$$

Where $a_x$, $a_y$, and $a_z$ represent measured acceleration samples in the X, Y, and Z directions respectively.

As shown in FIG. 7, the acceleration magnitude value of 3 g ("3 g Threshold") has been chosen as the threshold crossing point around which features are extracted. The index at which the acceleration magnitude first crosses the 3 g threshold is shown as $i_{cross}$. Parameters $k_1$ and $k_2$ may be positive integers that are used to select a window that is dependent on where the acceleration magnitude first crosses the threshold. The beginning and ending of the relevant window is the marked by $i_{start}$ and $i_{end}$. Sampled sensor data from $i_{start}$ to $i_{end}$ (illustrated via shading in FIG. 7) may be stored and processed. Using a threshold crossing point to define a window from which features are extracted may allow for a direct comparison between different potential collision events.

A number of distinct features may be extracted from the window (i.e., the time-series acceleration magnitude sample values corresponding to index $i_{start}$ to $i_{end}$). One example of a feature that may be extracted from the window is the maximum acceleration value within the window (approximately 5.5 g in FIG. 7). Additional non-limiting examples of features that may be extracted are illustrated in Table I, below.

In the notation of Table I, brackets indicate sampling. For example, given the vector A=[3,8,5], A[2]=8. "Diff" represents the consecutive differences of samples of a vector; for example, given A=[3,8,5], diff(A)=[5,−3]. "Max" indicates the maximum value of a vector and "argmax" indicates the index where the maximum value occurs.

TABLE I

| Feature Name | Formula | Parameters |
|---|---|---|
| Max | $A[i_{max}]$ | |
| Pre Max | $A[i_{previous}]$ | |
| Post Max | $A[i_{postmax}]$ | |
| Pre Min | $A[i_{premin}]$ | |
| Post Min | $A[i_{postmin}]$ | |
| N-Point Max Sum | $\sum_{k=i_{max}-n}^{i_{max}+n} A[k]$ | n |
| N-Point Post Min Sum | $\sum_{k=i_{postmin}-n}^{i_{postmin}+n} A[k]$ | n |
| N-Point Post Max Sum | $\sum_{k=i_{postmax}-n}^{i_{postmax}+n} A[k]$ | n |
| N-Point Pre Min Sum | $\sum_{k=i_{premin}-n}^{i_{premin}+n} A[k]$ | n |
| N-Point Pre Max Sum | $\sum_{k=i_{premax}-n}^{i_{premax}+n} A[k]$ | n |
| N-Point Max Standard Deviation | $\text{stddev } A[k]_{i_{max}-n}^{i_{max}+n}$ | n |
| Sum Between Minima | $\sum_{k=i_{postmin}}^{i_{premin}} A[k]$ | |
| Sum Between Minima Normalized | $\dfrac{\sum_{k=i_{postmin}}^{i_{premin}} A[k]}{i_{postmax} - i_{postmin}}$ | |
| Pre Slope | $A[i_{max}] - A[i_{premin}]$ | |
| Post Slope | $A[i_{max}] - A[i_{postmin}]$ | |
| Max Diff | max(diff(A)) | |
| Min Diff | min(diff(A)) | |

FIG. 8 graphically illustrates a number of the features given in Table I. Stated more formally, for the formulas shown in Table I, let A be the acceleration magnitude vector of length N for a single time-series acceleration set, and $n_1$, $n_2$, $n_3$, and $n_4$ be predetermined constants. Let $i_{max}$ be the index of the maximum value of the acceleration magnitude vector (i.e., the index of the point "Max" in FIG. 8):

$$i_{max} = \arg\max(A)$$

Let $i_{premin}$ be the index of the pre-maximum minimum (i.e., the index of the point "Pre Min" in FIG. 8):

$$i_{premin} = \frac{\operatorname{argmin}(A[k])}{k}$$

where $k = i_{max}, i_{max}-1, \ldots, i_{max}-n_2$.

Let $i_{premax}$ be the index of the pre-maximum maximum (i.e., the index of the point "Pre Max" in FIG. 8):

$$i_{premax} = \frac{\operatorname{argmax}(A[k])}{k}$$

where $k = i_{premin}, i_{premin}-1, \ldots, i_{premin}-n_1$.

Let $i_{postmin}$ be the index of the post-maximum minimum (i.e., the index of the point "Post Min" in FIG. 8):

$$i_{postmin} = \frac{\operatorname{argmin}(A[k])}{k}$$

where $k = i_{max}, i_{max}+1, \ldots, i_{max}+n_3$.

Let $i_{postmax}$ be the index of the post-maximum maximum (i.e., the index of the point "Post Max" in FIG. 8):

$$i_{postmax} = \frac{\operatorname{argmax}(A[k])}{k}$$

where $k = i_{postmin}, i_{postmin}+1, \ldots, i_{postmin}+n_4$.

As indicated, the features presented in Table I may not be exhaustive, other example features may include: maximum acceleration values, estimated slope from observed minimum to maximum, post-event activity metrics, approximate area beneath acceleration vector for various sub windows, standard deviation, mean, entropy, acceleration peak location, energy estimate, and maximum derivative, each with respect to each independent axis, and acceleration or other measurement magnitude.

Although the above-discussion of extracting features, to obtain feature vectors, included a number of features defined based on acceleration, sensor data from other sensors, or other types of data, may also be included in the feature vectors. For example, the feature vectors may include features extracted from measurements obtained from an audio sensor, a gyroscope, a barometer, a speedometer, a compass, and/or other sensors. The feature vectors may additionally include features extracted or derived from other data. For example, driver acceleration history, engine rotations per minute (RPM) history, or other information, may be used to classify a driver as an "aggressive" or "non-aggressive" driver. This classification may also be used as a feature in the feature vector.

Returning to FIG. 4, process 400 may further include splitting the feature vectors into testing and training portions (block 450). The training portions (i.e., the training feature vectors) may be used to train collision detection model 355. The testing portions (i.e., the testing feature vectors) may be used to test the trained collision detection model. Testing a trained model, using a portion of the complete data set of feature vectors, may be used as a guard against overtraining the model (i.e., overfitting the model to the training feature vectors). Overtraining/overfitting may generally occur when a model learns patterns in training data that are not representative of the real world. In one implementation, splitting the feature vectors into testing and training portions may be performed by randomly assigning each feature vector, from the complete set of feature vectors, as a training feature vector or testing feature vector. For example, 80% of the feature vectors may be randomly assigned as training feature vectors and 20% of the feature vectors may be randomly assigned as test feature vectors.

Process 400 may further include training the collision detection model (block 460). Collision detection model 355 may include a classification model trained from the training portion of the feature vectors and the corresponding labeled outputs indicating collision or non-collision. In one implementation, the classification model may include a Binary Classification Tree (BCT), neural network based classification, pattern matching classification techniques, or other techniques. The trained collision detection model, in response to receiving a feature vector as an input, may generate an indication of whether a vehicle collision is detected or not detected.

As previously mentioned, in some implementations, instead of outputting a binary (collision or no collision) output, the collision detection model may be trained to generate an output indicating multiple (e.g., three or more) potential collision states, such as "no collision," "non-severe collision," or "severe" collision. In general, classification models may seek to minimize an overall cost function. By assigning higher costs to higher severity crashes, the cost function operates to penalize the model more for misclassifying severe crashes. In this way, the collision detection model may potentially be tuned to be relatively accurate for high severity crashes, while retaining high false positive rejection characteristics. Detection-of-collision determinations may alternatively or additionally include generation or detection of other information relating to a potential collision of a given vehicle, such as: the direction of the collision (e.g., the direction of the other vehicle relative to the given vehicle), the speed of the given vehicle before the collision, or other information that may be useful in evaluating the potential severity of the collision.

Process 400 may further include testing and validating performance of the trained collision detection model (block 470). Testing and validating the performance may be performed based on the testing portion of the feature vectors. For example, the testing portion of the feature vectors may be input to collision detection model 355 and the output of the collision detection model compared to the know output labels. The trained collision detection model may be rejected (i.e., not used in the run-time environment of telematics device 212) if the performance of the collision detection model is below a threshold value on the testing portion of the feature vectors. For example, an operator may specify that the trained collision detection model must classify 100% of the confirmed vehicle collisions as collisions and have no more than a 10% false positive rate before the trained collision detection model will be used in real-world situations. More generally, if performance is substantively better on the training portion of the feature vectors relative to the testing portion of the feature vectors, it may be determined that the collision detection model is overfitting the data. Further, testing and training of classification models may be implemented using more sophisticated techniques, such as five-fold cross validation, where the data is split into five unique subgroups, for example, five unique 80% training/20% testing sets. These sets may be used to train and evaluate five different collision detection models. The model performances may then be compared to ensure consistent model behavior across various data set divisions. The data may be divided by random selection.

In some implementations, different collision detection models 355 may be trained for different types of vehicles. For example, separate collision detection models may be determined for different classes of vehicles (trucks, compact cars, etc.) or for different makes/models/years of the vehicles. Alternatively, an indication of the type of vehicle may be provided as an input feature to a model, which may allow the model to generate the classification result based on the type of vehicle.

Figure 9:
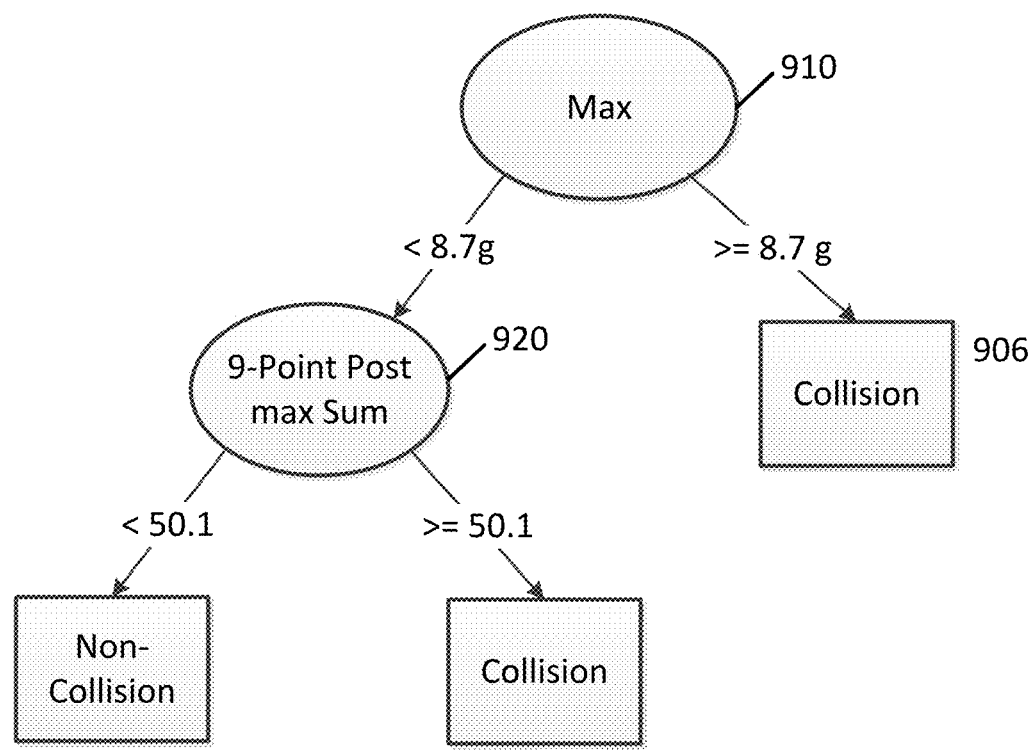
FIG. 9 is a diagram conceptually illustrating an example of a binary classification tree.

As previously mentioned, in one implementation, the collision detection model may be implemented using a BCT. FIG. 9 is a diagram conceptually illustrating an example of a BCT 900. BCT 900 may include nodes 910 and 920 (shown as ovals). Each node 910 and 920 may be associated with one or more criteria that results in a binary decision. Training of BCT 900 may include determining the nodes that make up BCT 900 and the criteria associated with each node. Run-time operation of BCT 900 (e.g., as performed in vehicles 210 by telematics devices 212) may include traversing BCT 900, starting at the top level node 910, until a collision or non-collision decision (shown in rectangles) is reached.

BCT 900 may be constructed (trained) using a divide and conquer technique, where each binary decision criteria is determined individually by considering the potential information gain resulting from each possible split. Information gain may be calculated using the metric of entropy from the field of information theory, where Entropy is defined as:

$$H(X) = -\sum_{x \in X} p(x) \log p(x)$$

where p(x) is the probability of a certain outcome (e.g., the frequency of collision or non-collision outcomes divided by the total number of events, for all events included in the set X). The information gain of each potential binary decision may be measured by the mutual information (MI) between test T and the class X:

$$MI = H(X) - H(T)$$

where H(T) is the resulting total entropy from a potential binary decision T.

In BCT 900, the first binary decision may be performed based on the feature "Max" (see Table I) (node 910). If the value of Max is greater than or equal to 8.7 g, the event is labeled as a collision. If the value of Max is less than 8.7 g, the tree proceeds to the decision in node 920. In node 920, if the "9-Point Post Max Sum" (see Table I) is greater than or equal to 50.1, the event is labeled as a collision. If the value is less than 50.1, the event is labeled as a non-collision.

In some implementations, the BCT, such as BCT 900, may be trained to determine the number of nodes and the criteria corresponding to each node, based on known techniques for automatically training BCTs. Left unchecked, BCTs built from maximizing sequential information gain may become unwieldy and large, commonly referred to as overfitting. Overfitting may be mitigated by pruning, a process where nodes of the BCT are automatically removed. The pruning process may continue until a predicted error rate for the entire tree stops decreasing. Pruning can also be conducted through expert opinion, such as where the final acceptance of a pruned BCT is controlled by human decision.

Figure 10:
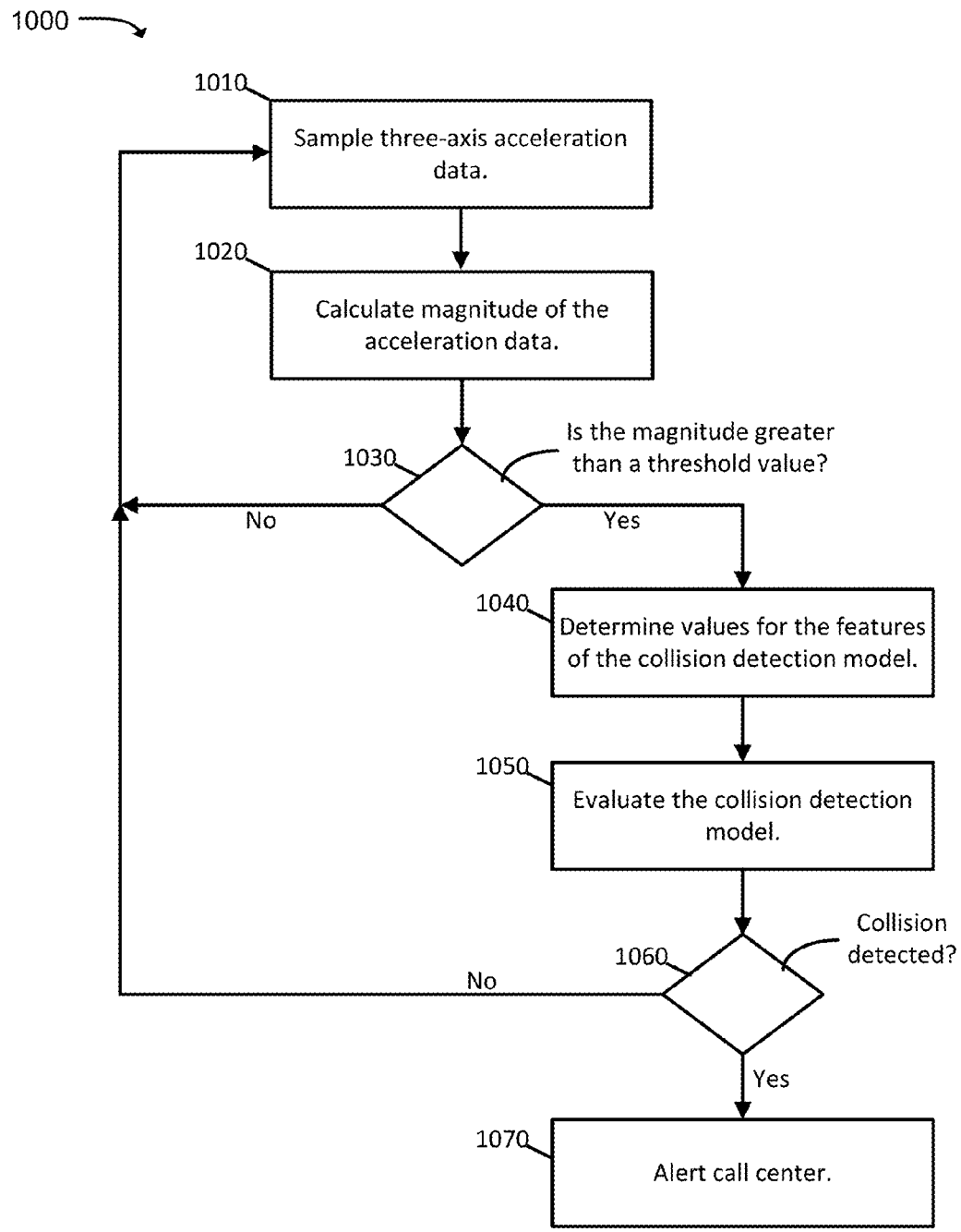
FIG. 10 is a flowchart illustrating an example process relating to real-world deployment of collision detection models.

FIG. 10 is a flowchart illustrating an example process 1000 relating to real-world deployment of collision detection models. Process 1000 may be implemented, for example, by telematics device 212 within vehicle 210. As previously mentioned, trained collision detection models 355 may be downloaded to telematics devices 212 within vehicles 210. Process 1000 may generally operate to automatically detect and report the occurrence of a vehicle collision.

Process 1000 may include sampling three-axis acceleration data (block 1010). As previously mentioned, telematics device 212 may include an accelerometer which may measure acceleration as three output values, corresponding to measurements of acceleration associated with orthogonal axes. Process 1000 may further include calculating the magnitude of the sampled three-axis acceleration data (block 1020). As previously mentioned, the magnitude may be calculated, using equation (1), as the square root of the sum of the squares of the individual acceleration values. The magnitude of each sample may thus represent the instantaneous acceleration magnitude of vehicle 210.

In one implementation, the sampled acceleration values or the calculated magnitude values may be stored in a buffer, such as a first-in-first-out (FIFO) buffer of a predetermined size, such as a size required to store K seconds (e.g., K may be set to two) of acceleration data. The contents of the FIFO buffer, at any particular time, may thus correspond to the most recent X seconds of acceleration data, which may be used when generating the model features.

Process 1000 may further include determining whether the calculated magnitude is greater than a threshold value (block 1030). Threshold may be, for example, a predetermined value (e.g., 1.5 g) that represents a minimum instantaneous acceleration magnitude that would typically need to occur in order for there to be a non-trivial vehicle collision. When the magnitude is not greater than the threshold, process 1000 may continue to sample acceleration data, calculate instantaneous acceleration magnitude, and compare the instantaneous acceleration magnitude to the threshold (block 1030—No).

Process 1000 may further include, when the acceleration magnitude is determined to be greater than the threshold (block 1030—Yes), determining values for features of the sampled acceleration values for processing with a collision detection model (block 1040). The collision detection model may be a model that was previously created (trained) using process 400. The model may be downloaded or otherwise provided to telematics device 212 of vehicle 210. As previously discussed, the collision detection model may operate on a number of input feature values (i.e., a feature vector) to classify the input feature values as corresponding to a collision or a non-collision (or, in some implementations, the classification may result in three or more possible output value, such as in a collision severity rating). Telematics device 212 may calculate values for the features that are used in the currently implemented collision detection model.

The features to use when evaluating the run-time version of the collision detection model may be determined during the training of the model. For example, as mentioned, when the model includes a BCT, the final BCT may be pruned to include only the features that are most relevant to classifying vehicle collisions. The feature values may include values that are calculated based on the sampled acceleration values, such as the sampled acceleration values obtain from an accelerometer associated with telematics device 212. Additionally, in some implementations, other features may be provided as inputs to the collision detection model. As discussed, the other features may include, for example, features extracted from measurements obtained from an audio sensor, a gyroscope, a barometer, a speedometer, a compass, and/or other sensors associated with telematics device 212 (or another device); features obtained from OBD data of the vehicle, such as features derived from engine rotations per minute (RPM) history or other information; and/or a classification value of the driver as an "aggressive" or "non-aggressive" driver (e.g., as derived from driver acceleration history), etc.

Process 1000 may further include evaluating features of the sampled acceleration values with the collision detection model (block 1050). The evaluation may be performed based on the values that were determined for the features corresponding to the collision detection model. When the evaluation indicates a collision (block 1060—Yes), process 1000 may include alerting the call center of the collision (block 1070). For example, telematics device 212 may automatically contact call center 230, such as via a cellular wireless network, to indicate the occurrence of the potential vehicle collision. An operator at call center 230 may evaluate the alert and determine an appropriate action, such as calling vehicle 210, immediately calling emergency response center 240, or other actions. In some implementations, alerting the call center of the collision may include automatically initiating a voice call between the driver of vehicle 210 and an operator at call center 230.

When a collision is not detected based on evaluation of the collision detection model (block 1060—No), process 1000 may continue back to block 1010, where acceleration data may continue to be sampled for comparison to the threshold value.

Figure 11:
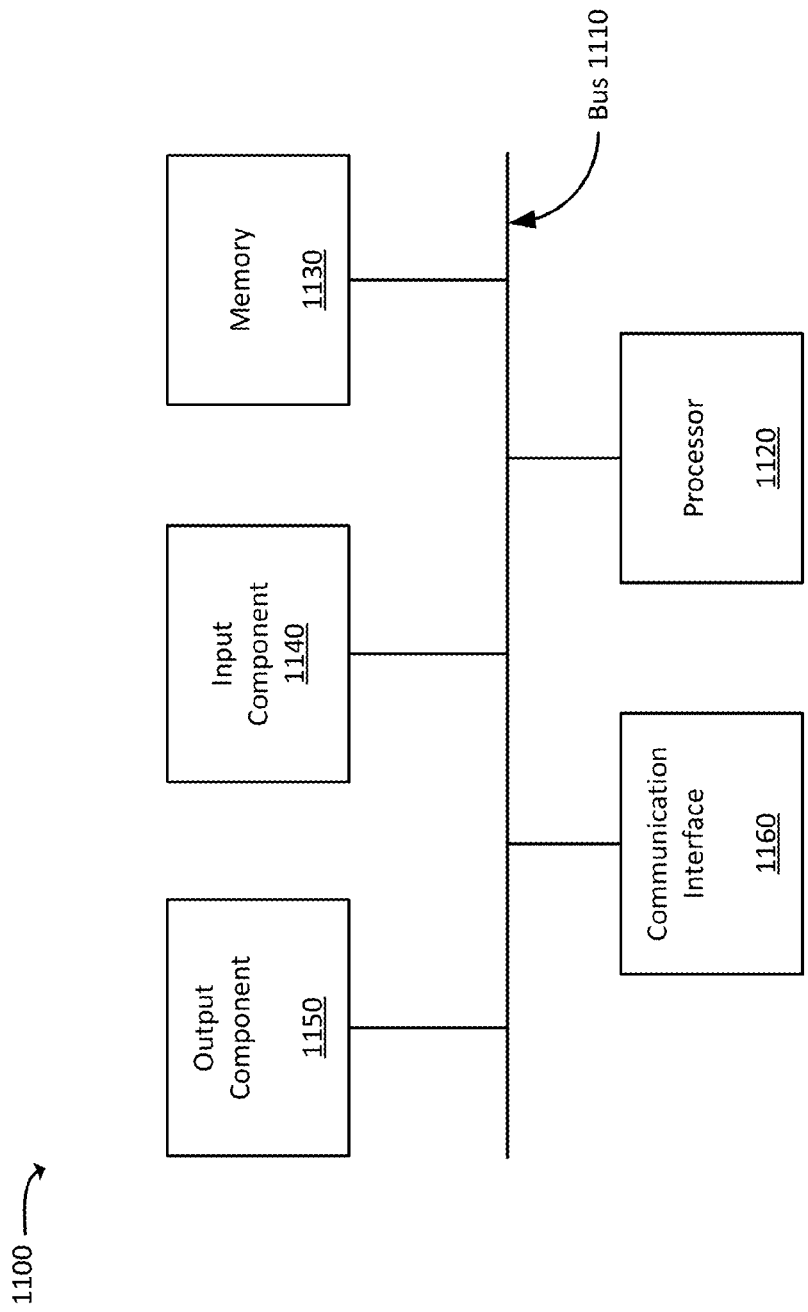
FIG. 11 is a diagram of example components of a device.

FIG. 11 is a diagram of example components of a device 1100. One or more of the devices described above (e.g., as described with respect to FIGS. 1, 2, and/or 3) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may include processing circuitry to interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1120 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4, 6, and 10, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
    an accelerometer to measure acceleration of the device; and
    processing circuitry to:
        calculate, based on the measured acceleration of the device, an acceleration magnitude value,
        compare the acceleration magnitude value to a threshold,
        determine, when the comparison indicates that the acceleration magnitude value satisfies the threshold, at least one feature based on a plurality of acceleration magnitude values, the at least one feature including an N-point pre max sum calculated as a sum of a plurality of acceleration magnitude values corresponding to a window of acceleration magnitude values centered around an acceleration magnitude value that occurs before the acceleration magnitude value that satisfied the threshold,
        evaluate, when the comparison indicates that the acceleration magnitude value satisfies the threshold, a collision detection model based on the determined at least one feature, the evaluation of the collision detection model indicating whether the device is involved in a vehicle collision, and
        alert an emergency call center when the evaluation of the collision detection model indicates that the device is involved in the vehicle collision.

2. The device of claim 1, wherein the determination of the at least one feature includes determining a plurality of features that are additionally determined based on one or more of:
    data received from an On-Board Diagnostics (OBD) port of a vehicle, or
    sensor data relating to a gyroscope, a barometer, a compass, or a speedometer.

3. The device of claim 1, wherein the device further includes:
    an On-Board Diagnostics (OBD)-II connector to connect to an OBD-II port of the vehicle.

4. The device of claim 1, wherein the at least one feature additionally includes an N-point post max sum calculated as a sum of a plurality of acceleration magnitude values corresponding to a window of acceleration magnitude values centered around an acceleration magnitude value that occurs after a particular acceleration magnitude value that satisfied the threshold.

5. The device of claim 1, wherein the at least one feature additionally includes an N-point pre max sum calculated as a sum of a plurality of acceleration magnitude values corresponding to a window of acceleration magnitude values centered around a maximum acceleration magnitude value that occurs within a first predetermined number of samples prior to a minimum acceleration magnitude value that occurs within a second predetermined number of samples prior to an absolute maximum acceleration magnitude value that occurs within a third predetermined number of samples from a particular acceleration magnitude value that satisfied the threshold.

6. The device of claim 1, wherein the at least one feature additionally includes a maximum acceleration magnitude value calculated in a window of acceleration magnitude values centered around a particular acceleration magnitude value that satisfied the threshold.

7. The device of claim 1, wherein the collision detection model includes a collision detection model based on a binary classification tree.

8. The method of claim 1, further comprising:
wirelessly transmitting, when the comparison indicates that the acceleration magnitude value satisfies the threshold, the at least one feature to a server device.

9. A method comprising:
determining, by a telematics device, three-axis acceleration measurements associated with the telematics device;
calculating, by the telematics device and based on the measured three-axis acceleration measurements, acceleration magnitude values;
determining, by the telematics device, that the acceleration magnitude value satisfies a minimum threshold value;
determining, by the telematics device and based on the determination that the acceleration magnitude value satisfies the minimum threshold value, at least one feature based on a time series of the acceleration magnitude values, the at least one feature including an N-point pre max sum calculated as a sum of a plurality of acceleration magnitude values corresponding to a window of acceleration magnitude values centered around an acceleration magnitude value that occurs before the acceleration magnitude value that satisfied the threshold;
evaluating, by the telematics device and based on the determination that the acceleration magnitude value satisfies the minimum threshold value, a collision detection model based on the determined at least one feature, the evaluation of the collision detection model indicating whether the telematics device is associated with a vehicle collision; and
alerting, by the telematics device, an emergency call center when the evaluation of the collision detection model indicates that the telematics device is associated with a vehicle collision.

10. The method of claim 9, wherein the determination of the at least one feature includes determining a plurality of features based on one or more of:
data received from an On-Board Diagnostics (OBD) port of a vehicle, or
sensor data relating to a gyroscope, a barometer, a compass, or a speedometer.

11. The method of claim 9, wherein the at least one feature additionally includes an N-point post max sum calculated as a sum of a plurality of acceleration magnitude values corresponding to a window of acceleration magnitude values centered around an acceleration magnitude value that occurs after a particular acceleration magnitude value that satisfied the threshold.

12. The method of claim 9, wherein the at least one feature additionally includes a maximum acceleration magnitude value calculated in a window of acceleration magnitude values centered around a particular acceleration magnitude value that satisfied the threshold.

13. The method of claim 9, wherein the evaluation of the collision detection model indicates a severity level of the vehicle collision.

14. The method of claim 9, wherein the collision detection model includes a collision detection model based on a binary classification tree.

15. A method comprising:
receiving, by one or more computing devices, sensor data generated by sensors associated with a plurality of vehicles;
extracting features from the sensor data, the features including features based on a time series of acceleration magnitude values associated with the plurality of vehicles, at least one of the features including an N-point pre max sum calculated as a sum of a plurality of the acceleration magnitude values corresponding to a window of acceleration magnitude values centered around an acceleration magnitude value that occurs before a particular acceleration magnitude value;
associating, by the one or more computing devices, the sensor data with sets of data corresponding to potential vehicle collisions, each of the sets of data being associated with a label indicating whether the set of data corresponds to an actual vehicle collision or a non-collision; and
training, by the one or more computing devices and based on the labeled sets of data, a classification model to distinguish between sensor data corresponding to vehicle collisions and sensor data corresponding to non-collisions.

16. The method of claim 15, wherein associating each of the sets of data with a label further comprises:
performing automated keyword analysis on call center logs to associate each of the sets of data with the label.

17. The method of claim 15, wherein the sensor data corresponds to sensor data that is received in response to automatic detection of potential collisions at the plurality of vehicles.

18. The method of claim 15, wherein the sensor data includes data sensed by an accelerometer, a barometer, a magnetometer, or a gyroscope.

19. The method of claim 15, wherein the label associated with each of the sets of data indicates a severity of the vehicle collision.

20. The method of claim 15, wherein the classification model includes a classification model based on a binary classification tree.

* * * * *